United States Patent [19]
Midkiff

[11] Patent Number: 5,128,031
[45] Date of Patent: Jul. 7, 1992

[54] POOL SURFACE SKIMMER

[75] Inventor: David G. Midkiff, Falls Church, Va.

[73] Assignee: Marking Designs, Inc., Dunn Loring, Va.

[21] Appl. No.: 507,498

[22] Filed: Apr. 11, 1990

[51] Int. Cl.$^5$ .............................................. B01D 35/05
[52] U.S. Cl. ....................................... 210/109; 210/138; 210/169; 210/242.1; 210/416.2; 15/1.7
[58] Field of Search .................... 4/507, 512, 513, 490; 210/109, 138, 242.1, 416.2, 169, 242.3, 923; 15/1.7

[56] References Cited

U.S. PATENT DOCUMENTS

| | | | |
|---|---|---|---|
| 3,576,257 | 4/1971 | Yates | 210/242.3 |
| 3,630,376 | 12/1971 | Price | 210/242.3 |
| 3,676,885 | 7/1972 | Wule | 15/1.7 |
| 3,682,316 | 8/1972 | Waren | 210/242.3 |
| 3,730,119 | 5/1973 | Budris et al. | 210/242.3 |
| 3,731,813 | 5/1973 | Tipton | 210/242.3 |
| 3,758,276 | 9/1973 | Bond | 210/242.1 |
| 3,767,055 | 10/1973 | Flatland | 210/169 |
| 3,823,828 | 7/1974 | Derzhavets et al. | 210/242.3 |
| 3,860,518 | 1/1975 | Henricksen | 210/169 |
| 3,875,062 | 4/1975 | Rafael | 210/923 |
| 3,928,202 | 12/1975 | Raubenheimer | 15/1.7 |
| 3,928,206 | 12/1975 | Waren | 210/923 |
| 4,033,876 | 7/1977 | Cocjin et al. | 210/923 |
| 4,067,811 | 1/1978 | Dallamore | 210/923 |
| 4,100,072 | 7/1978 | Uchida et al. | 210/923 |
| 4,105,557 | 8/1978 | Weatherholt | 210/242.1 |
| 4,151,081 | 4/1979 | Bolli et al. | 210/923 |
| 4,461,704 | 7/1984 | Selsted | 210/242.1 |
| 4,720,340 | 1/1988 | O'Brien | 210/169 |
| 4,734,235 | 3/1988 | Holyoak | 210/242.2 |
| 4,744,565 | 5/1988 | Newburger | 210/242.1 |
| 4,746,424 | 5/1988 | Drew | 210/169 |
| 4,851,133 | 7/1989 | Rymal | 210/242.3 |
| 4,900,432 | 2/1990 | Arnold et al. | 210/169 |
| 4,921,605 | 5/1990 | Chastan-Bagnis et al. | 210/923 |

FOREIGN PATENT DOCUMENTS 0056251  5/1979  Japan ................. 210/416.2

Primary Examiner—Ivars Cintins
Assistant Examiner—Robert James Popovics
Attorney, Agent, or Firm—Watson, Cole, Grindle & Watson

[57] ABSTRACT

A self-propelled skimmer is provided for removing debris from the surface of a pool. A pump driven propulsion system intakes water at one end and forcefully expels it at the other end. A filter is located at the intake to trap debris for ultimate removal and disposal. To clear the entire surface of the pool, the expulsion of the liquid is randomly altered in a center-right-left sweep. A pressure sensitive transducer or switch is provided at the front of the skimmer to activate a reverse movement if the skimmer front impacts a pool edge or other obstacle.

12 Claims, 2 Drawing Sheets

POOL SURFACE SKIMMER

BACKGROUND OF THE INVENTION

1. Technical Field of the Invention

The present invention relates generally to liquid surface skimmers, and more particularly to a self-propelled, pool surface skimmer.

2. Discussion of the Related Art

Outdoor pools are often contaminated by a wide array of objects such as leaves, plant debris, mown grass, dirt, algae, insects, etc. Accordingly, filtration systems are often installed in the pool to continuously circulate some of the pool water through a pump system having a filter and an entry port located near the surface. These entry ports often become clogged with debris since their entry radius is limited. Also, since debris often sinks when it becomes waterlogged, effective cleaning is limited by the size of the entry port, the number and location of the entry ports, and the strength of the intake currents produced by the filtration system pumps. In addition, the resulting complex system is not optimally adaptable to a wide range of pool geometries.

Other skimming devices have been proposed which require an operator to steer or control the skimming unit. For example, U.S. Pat. No. 4,720,340 discloses a skimming blade which deflects floating debris into the mouth of a pool filtration system. The blade must be positioned by a user at various locations in the pool to permit the entire surface area to be cleaned, thereby necessitating constant supervision and adjustment during the cleaning operation. Also, use of a manually operated skimming blade attached to a pole is both time consuming and physically demanding.

Accordingly, it is an object of the present invention to provide an apparatus which effectively skims the surface of a body of liquid before the debris sinks.

It is a further object of the present invention to accomplish the foregoing object with a simple apparatus.

It is yet another object of the present invention to accomplish the foregoing objects regardless of pool geometry.

It is a further object of the present invention to effectively skim the entire surface of the pool.

It is another object of the present invention to accomplish the foregoing objects without the need for constant supervision and control.

Further objects and advantages of the present invention are apparent from the specification and drawings which follow.

SUMMARY OF THE INVENTION

The foregoing and additional objects are obtained by a self-propelled pool surface skimmer according to the present invention. This apparatus comprises a hull having a liquid intake at the surface of the pool, and a liquid outlet in fluid communication with the liquid intake. A filter is located between the liquid intake and the liquid outlet. Means for propelling the hull through the liquid is also provided.

Means for controlling the direction of the forcibly expelled liquid may also be provided. This means comprises a tube for directing the expelled liquid. The tube has a discharge end comprising the liquid outlet. The controlling means also includes means for altering the position of this discharge end relative to the central axis of the hull. The directing tube can be flexible and the altering means can comprise a bell crank connected to the flexible directing tube and means for actuating the bell crank.

Means for sensing an impact between the hull and an object can also be provided. This impact sensing means reverses the direction of direction controlling means when an impact is sensed.

DETAILED DESCRIPTION OF A PREFERRED EMBODIMENT

Figure 1:
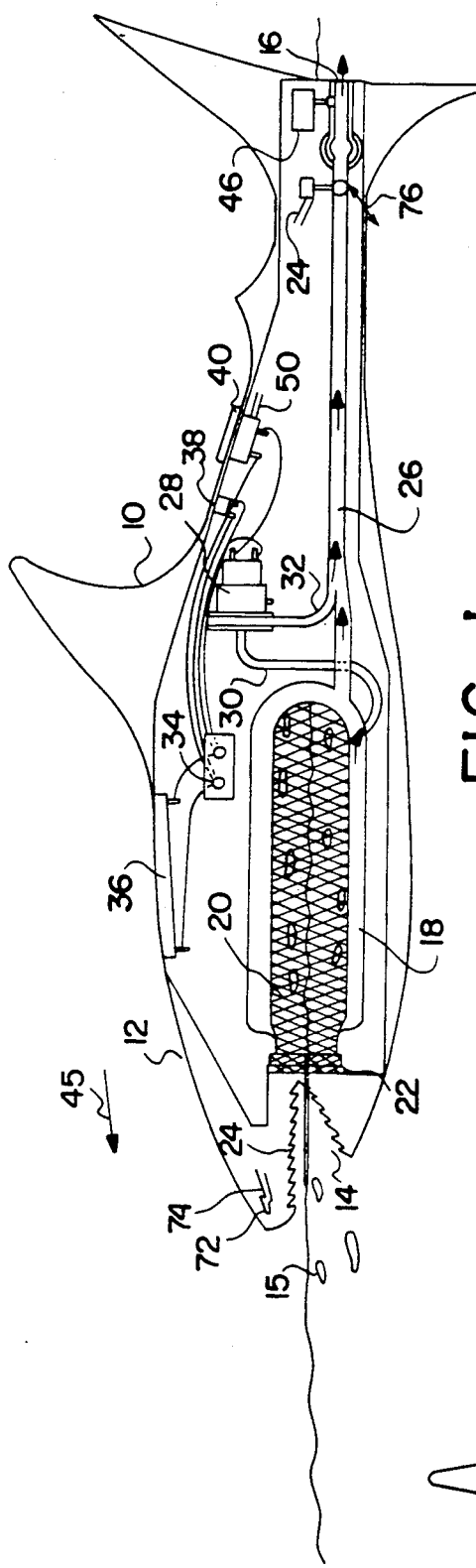
FIG. 1 is a side elevational view, partly in section, of a preferred embodiment of a self-propelled, pool surface skimmer according t the present invention.
Figure 2:
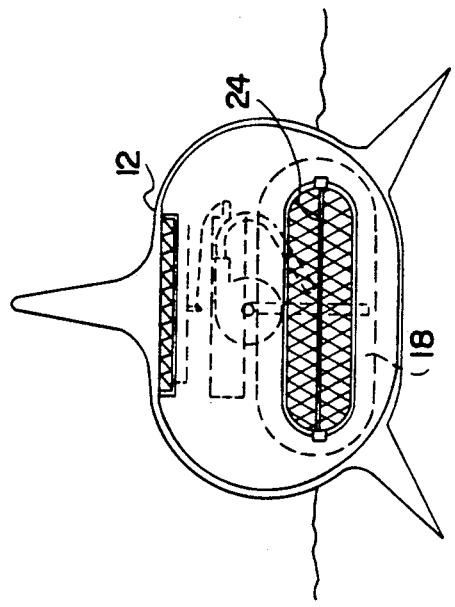
FIG. 2 is a front elevational view, partly in section, of the skimmer of FIG. 1.

The present invention will now be explained in greater detail with reference to the accompanying drawings of a preferred embodiment of the invention. Referring to FIG. 1, a self-propelled pool skimmer 10 according the present invention is shown. Skimmer 10 comprises a hull 12 having an intake 14 and an outlet 16 located at opposite ends of the hull. Outlet 16 is located below water surface 15. As depicted in FIG. 1, hull 12 may have a fanciful design, such as a shark or any other design such as other marine life or vessels. The shape of hull 12 is accordingly within the discretion of the designer so long as the hull and the enclosed elements are buoyant to such a degree that approximately one half of intake 14 is submerged below the water surface 15 to provide a sufficient intake of water which contains debris.

A filter chamber 18 is provided within hull 12 and is in fluid communication with intake 14. A reusable filter bag 20 is located within chamber 18 and secured at its mouth around intake 14 by a bag retainer ring 22. Filter bag 20 may be removed from chamber 18 via a removal hoop 24, which allows ring 22 to be disengaged from the mouth of intake 14.

Filter chamber 18 is in fluid communication with outlet 16 via an outflow line 26. A pump 28 is located within hull 12 and is fluidly connected to chamber 18 via a pump input line 30. A pump output line 32 allows discharged, pressurized water to enter outflow line 26 and be forced towards outlet 16. Pump 28 may be powered in any conventional manner, such as by a rechargeable battery 34. Battery 34 is recharged by solar panels 36 and/or a recharger plug 38 adapted for a standard household electrical supply. An on/off switch 40 is provided to activate pump 28.

To operate the skimmer 10, the device is placed in the pool and switch 40 is moved to "on " position. Pump 38 then draws debris-containing water into intake 14 where the debris is trapped within filter bag 20. Filtered, debris-free water passes through filter bag 20 into chamber 18. A portion of this clean water enters pump 28 via input line 30, where it is pressurized and expelled via output line 32 into outflow line 26.

As the pressurized water exits outlet 16 located beneath water surface 15, the skimmer 10 is advanced in a direction opposite this discharge, i.e., the skimmer 10 is propelled in the direction of arrow 45. As the skimmer 10 travels through the water, more debris is trapped in filter bag 20 as more water is introduced. Also, this propulsion system aids in removing from skimmer 10 the portion of filtered water which does not pass through pump 28 as the entering water displaces the water from chamber 18 into outflow line 26.

Figure 3:
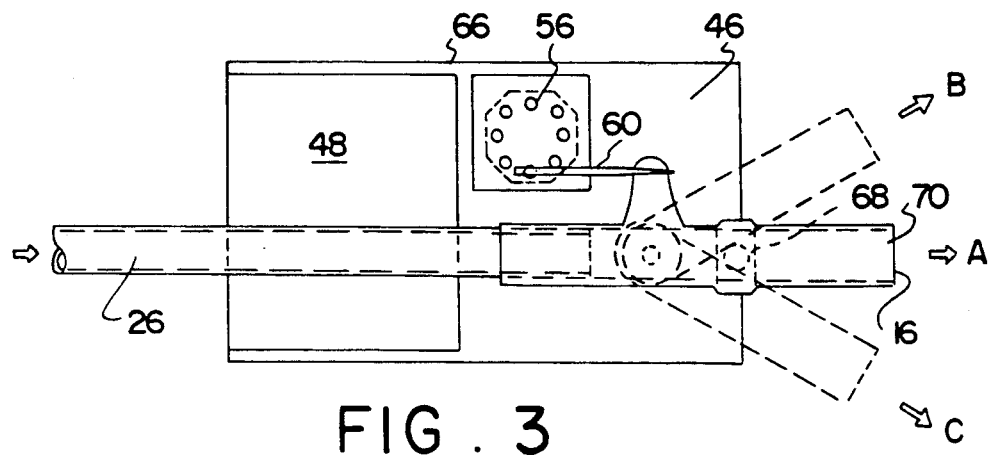
FIG. 3 is an enlarged, diagrammatic, bottom plan view of the aft section of the skimmer embodiment, showing the direction control system.
Figure 4:
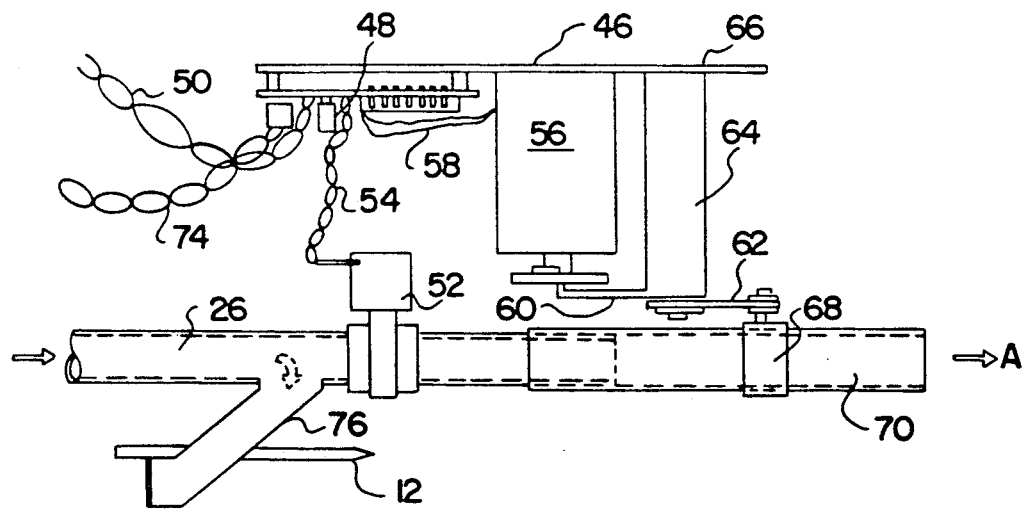
FIG. 4 is an enlarged, diagrammatic side elevational view of the direction control system of FIG. 3.

The course of the self-propelled skimmer is determined by a swivel direction control unit 46, which is shown in detail in FIGS. 3 and 4. A random timing, integrated circuit board 48 is provided, which is powered by battery 34 via appropriate connection lines 50. Circuit board 48 controls both a micro solenoid flow control valve 52 via lines 54 and a servomotor 56 via lines 58. Servomotor 56 drives a bell crank 62 via a connecting rod 60. Bell crank 62 is in turn connected to a swivel tube clamp 68. Circuit board 48, motor 56 and a standoff support column 64 for bell crank 62 are all supported by a supporting base plate 66, which is fixed in the interior of hull 12. A flexible discharge tube 70 of any suitable material, e.g. polyethylene, is connected to outflow line 26 to define outlet 16 and is surrounded by swivel tube clamp 68. Flexible discharge tube 70 permits forward motion in variety of directions, as discussed below.

When switch 40 is turned on and pump 38 activated, random timing circuit board 48 is also activated to begin an initial period of random length of a timing cycle. During this initial period, flexible tube 70 is, for example, in position A such that outlet 16 is aligned with the central axis of the hull 12, and skimmer 10 will accordingly be propelled in the forward direction as discussed above. After this initial period, circuit board 48 signals servomotor 56 to rotate 30° from the central axis to cause bell crank 62 to position flexible tube 70 in either position B or C. To simplify the following discussion, it is assumed that tube 70 and outlet 16 are moved to position B. Accordingly, skimmer 10 will be move to starboard (FIG. 3 is a bottom view). This starboard or rightward movement is also of random duration.

Next, the circuit board 48 signals servomotor 56 to activate the rotation of bell crank 62 to move tube 70 and outlet 16 to position C. Accordingly, skimmer 10 moves to port. After this third period of random length of motion, circuit board 48 signals servomotor 56 to return tube 70 and outlet 16 to position A.

This forward/starboard/port cycle is repeated to allow the skimmer 10 to effectively traverse the entire surface of the pool. The exact sequence of directions selected is left to the individual skilled artisan. Also, the random determination of the length of each directional period may be replaced with appropriate circuitry to allow for predetermined period lengths.

In the course of its travels through the pool, the skimmer will ultimately contact pool edges or other obstacles. To prevent the skimmer from becoming lodged with its nose abutting an obstacle, an impact sensitive micro transducer or switch 72 is located in the forward part of hull 12, e.g., in the nose of the shark configuration. Switch 72 is connected by lines 74 to circuit board 48, which in turn communicates with solenoid valve 52 via lines 54. When an impact is sensed by switch 72, a signal is accordingly transmitted to close valve 52. This closing terminates water flow to the outlet 16, and directs the flow to reverse outlet 76. Reverse outlet 76 is oriented to direct outlet-water flow in a reverse direction, i.e., in the direction of arrow 45 in FIG. 1, which causes the hull 12 to move in a generally aft direction. This reverse sequence may be timed for a relatively short period compared to the other directional periods so that the skimmer can back up a sufficient amount from the obstacle to allow random forward movement once again when the valve 52 is opened at the end of the reverse period.

The random movement of the present invention allows the entire surface of the pool to be efficiently skimmed and cleared before debris starts to sink. In addition, the present invention can skim any pool, regardless of geometry, as a result of random forward motions and reverse capabilities. The control system of the present invention also allows the user to leave the functioning skimmer unattended in the pool during the course of the cleaning process. Furthermore, this effective and convenient cleaning is accomplished by a relatively simple, cost effective device which is easy to operate and maintain. Thus, the present invention represents a significant advancement over the prior art.

Various modifications and improvements will become apparent to those skilled in the art without departing for the spirit of the present invention, which is to be limited only by the scope, including equivalents, of the following, appended claims.

I claim:

1. A self-propelled, apparatus for moving across and removing debris from the surface of a pool, comprising:
    a hull having liquid intake and liquid outlet mean sin fluid communication with each other;
    a filter located between said liquid intake and said liquid outlet means;
    a pump mounted on said hull and having liquid input and liquid outlet means in communication with each other through said pump, said liquid outlet means being in communication with the exterior of said hull;
    means for energizing said pump to take in liquid through its liquid input means and forcefully expel such liquid through its liquid output means, and
    means for controlling the direction of said forcefully expelled liquid, said means comprising a tube for directing the expelled liquid from its discharge end, and means for altering the position of the discharge end of said tube relative to said hull.

2. The apparatus according to claim 1, further comprising means for controlling the direction of the forcefully expelled liquid.

3. The apparatus according to claim 1, wherein said altering means comprises means for randomly altering the discharge end position relative to the central axis of said hull.

4. The apparatus according to claim 1, wherein said directing tube is flexible and said altering means comprises a bell crank connected to said flexible directing tube and means for actuating said bell crank.

5. The apparatus according to claim 4, wherein said actuating means comprises a motor and a random timing means for controlling the motor.

6. Apparatus as claimed in claim 1, in which said output means of said pump is in fluid communication with said outlet means of said hull, and forces liquid from said pump output means to exit said hull through said hull outlet means.

7. Apparatus as claimed in claim 6, in which liquid flowing past and filtered by said filter enters the liquid input means of said pump.

8. A self-propelled, apparatus for moving across and removing debris from the surface of a pool, comprising:

a hull having liquid intake and liquid outlet means in fluid communication with each other;

a filter located between said liquid intake and said liquid outlet means;

a pump mounted on said hull and having liquid input and liquid outlet means in communication with each other through said pump, said liquid outlet means being in communication with the exterior of said hull;

means for energizing said pump to take in liquid through its liquid input means and forcefully expel such liquid through its liquid output means, and means for controlling the direction of said forcefully expelled liquid, said means including means for directing the expelled liquid in one direction and means for directing said liquid in substantialy the opposite direction.

9. The apparatus according to claim 8, wherein said opposite directing means includes a reverse discharge tube for discharging expelled liquid and means for opening and closing said tube.

10. The apparatus according to claim 9, wherein said opening and closing means is a solenoid valve.

11. The apparatus according to claim 8, further comprising means for sensing an impact between said hull propelled in said first direction and another object, said sensing means being operable to direct said forcefully expelled liquid in said opposite direction when an impact is sensed.

12. The apparatus according to claim 11, wherein said sensing means comprises a pressure transducer in communication with said liquid directing means.

* * * * *